C. WHEELER, Jr.

Car Spring.

No. 97,842.

Patented Dec. 14, 1869.

WITNESSES

INVENTOR

United States Patent Office.

CYRENUS WHEELER, JR., OF AUBURN, NEW YORK.

Letters Patent No. 97,842, dated December 14, 1869.

IMPROVED CAR-SPRING.

The Schedule referred to in these Letters Patent and making part of the same.

*To all whom it may concern:*

Be it known that I, CYRENUS WHEELER, Jr., of the city of Auburn, in the county of Cayuga, and State of New York, have invented certain new and useful Improvements in "Springs for Cars and other purposes;" and I do hereby declare that the following is a full, clear, and exact description thereof, reference being had to the accompanying drawings, and to the letters of reference marked thereon, forming part of this specification, in which—

Figure 1:
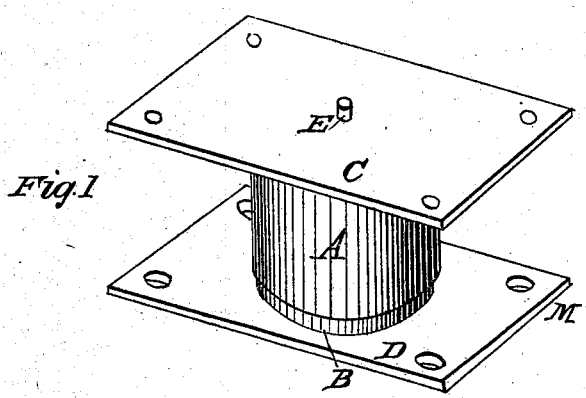

Figure 1 is a perspective view, and

Figure 2:
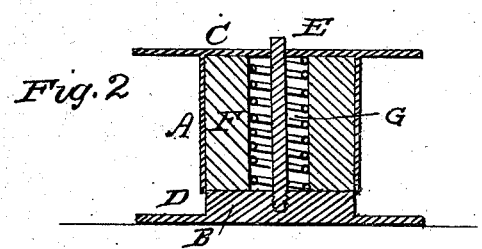

Figure 2, a vertical section through the centre of fig. 1.

The same letters indicate like parts in each figure.

The nature of the invention consists in combining a rubber cylinder with a metallic cylinder and piston, so as to produce a light and strong spring, and further consists in uniting a spiral spring, of metal, with the rubber and metallic cylinders.

In the drawings—

A represents a metallic cylinder, open at its lower end, and closed at its upper end by a head or flange-piece, C, which projects beyond its circumference, and has holes in each corner, for securing it to the object to be acted upon or supported.

B is the piston or follower, of a little less external diameter than the internal diameter of the cylinder A, and has a flange, D, with holes in each corner, for fastening it to its bed or support.

To the piston B is fastened a spindle, E, which projects therefrom a little more than the length of the cylinder A.

When the piston B and the cylinder A are united, this spindle E is inserted in a hole through the centre of the head or flange C, and will slide freely.

F is a cylinder, of rubber, corresponding in outer diameter very nearly to the internal diameter of the cylinder A, in which it is inserted, and it is a little less in length than the internal length of the cylinder.

This rubber cylinder has a hole vertically through its centre, equal to about one-third its whole diameter.

This hole may vary in diameter, according to the purposes to which the spring may be applied.

This hole is for the purpose of permitting the rubber, under pressure, to expand or spread inwardly, as its confinement outwardly by the walls of the metal cylinder A prevents its expansion in that direction.

By this arrangement and combination, a light, compact spring, of great power, and any required degree of elasticity, may be obtained.

To give the spring still greater power where great weights are to be sustained and severe shocks encountered, the spiral spring G is inserted in the centre of the rubber, thus helping sustain the inner walls of the rubber under great pressure, and prevent its excessive expansion inwardly.

In its application, to use the flanges or heads, C and D are the bearing-points, which, under pressure, force the piston B into the cylinder A, the spindle G serving to guide and steady it in its vibrations. As the pressure increases, the rubber expands inwardly, contacting the hole in its centre; and as the weight is diminished, the rubber contracts, diminishing the thickness of its walls, and enlarging the diameter of the hole.

When used with the spiral spring, the internal walls of the rubber are sustained by the spring; and, as the rubber, under pressure, expands upon the outer circumference of the spring, the spring contracts in its diameter, and the rubber expands, in a measure, between the coils of the spring.

Having described the invention, its construction, and application,

What I claim as new, and desire to secure by Letters Patent, is—.

1. The combination of the metallic cylinder and the hollow rubber cylinder with the piston or follower, substantially as described.

2. The combination of the metallic cylinder and the hollow rubber cylinder with the spiral spring and the piston or follower, substantially as described.

C. WHEELER, JR.

Witnesses:
EDM. F. BROWN,
R. P. ANDERSON.